Feb. 10, 1970     R. RUPRECHT ET AL     3,494,448
REINFORCED BRAKE
Filed June 20, 1967
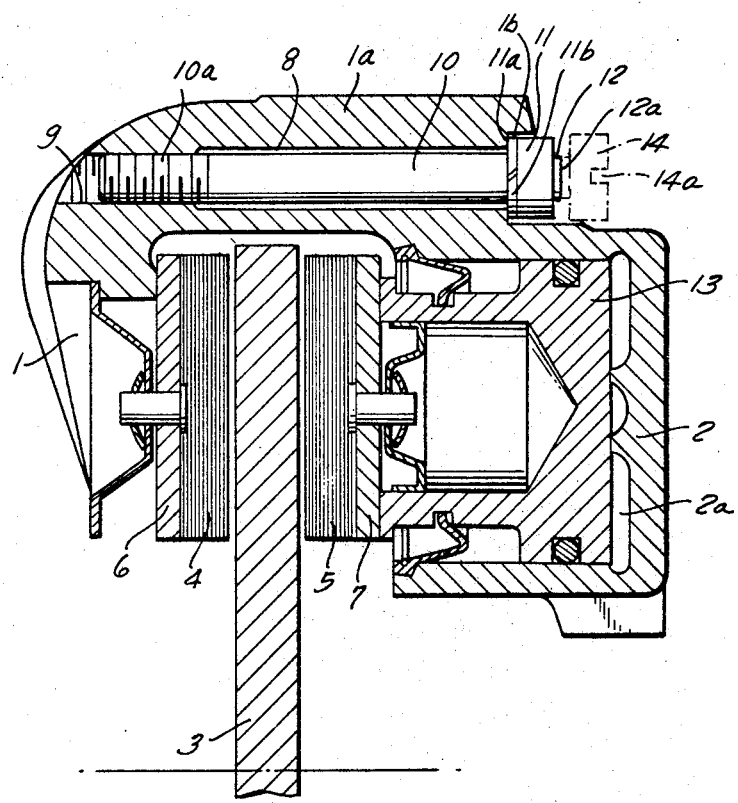
INVENTORS
Robert Ruprecht
BY Nick Schaffner
Michael S. Striker
ATTORNEY

# United States Patent Office 3,494,448
Patented Feb. 10, 1970

3,494,448
REINFORCED BRAKE
Robert Ruprecht, Aichelberg, and Erich Schaftner, Stuttgart-Zuffenhausen, Germany, assignors to Ernst Heinkel Aktiengesellschaft, Stuttgart-Zuffenhausen, Germany
Filed June 20, 1967, Ser. No. 647,484
Claims priority, application Germany, June 30, 1966, H 59,821
Int. Cl. F16d 55/224
U.S. Cl. 188—73
9 Claims

ABSTRACT OF THE DISCLOSURE

The yoke of a U-shaped supporting means of the brake jaws of a brake, is reinforced by a pretensioned bolt which prestresses the yoke against the reaction forces produced by the hydraulic motor operating the brake jaws.

BACKGROUND OF THE INVENTION

The present invention relates to brakes of the type having a U-shaped supporting body whose legs are disposed on opposite sides of a brake disc against which brake jaws are pressed by a fluid motor mounted on the supporting body.

In brakes of this type, the brake pressure produces substantial reaction forces acting on the legs of the U-shaped supporting body and tending to bend the yoke portion of the same.

Since the brake forces may be very high, the bending moments acting on the yoke portion are also very high, which would require an increase of the thickness of the yoke portion. However, particularly if the brake is used for motor cars, there is insufficient space available so that the yoke portion of the supporting body cannot be made heavy enough to withstand deformation by great brake forces. Furthermore, large dimensions of the supporting body increase the cost and the weight of the brake.

SUMMARY OF THE INVENTION

It is one object of the invention to overcome this disadvantage of brakes of this type, and to reinforce the yoke portion of the U-shaped supporting body in a simple and inexpensive manner without increasing the dimensions of the same.

Another object of the invention is to pretension the yoke portion of the U-shaped supporting body so that the reaction forces acting on the legs of the U-shaped supporting body, cannot substantially deform the supporting body.

With these objects in view, the present invention is concerned with an improvement of a brake which includes a movable brake disc, a supporting body having a substantially U-shaped cross-section, and composed of a yoke portion and a pair of leg portions located on opposite sides of the brake disc; operating means, for example a fluid motor, mounted on at least one of the leg portions, and first and second brake jaws respectively mounted on the operating means and on the other leg portion.

When the operating means is actuated, for example if the piston of the hydraulic motor presses the brake jaws into frictional contact with the opposite sides of the brake disc, reaction forces opposite to the brake forces act on the leg portions and tend to deform the yoke portion.

In accordance with the improvement of the invention, pretensioned means are mounted on the yoke portion for exerting pressure on the same opposing the reaction forces.

In the preferred embodiment of the invention, a longitudinal bore extends through the central line of the yoke portion, and the pretensioned means is a threaded bolt located in the bore. One end of the bore has threads, and the other end of the bore has an abutment face. The bolt has a corresponding thread at one end, and is screwed into the threaded portion of the bore until a projection or flange at the other end of the bolt, abuts the abutment face. By further turning the bolt, the same is tensioned, and the yoke is prestressed against the bending moments of the reaction forces to the required degree.

The bolt has a head portion with a slot for engagement by a screw driver. However, in order to prevent a loosening of the bolt by a tool after the yoke portion has been prestressed by the bolt, the head is provided on a neck which is twisted off when the head of the bolt is turned with great force which pretensions the bolt to a degree corresponding to the predetermined degree required for prestressing the yoke in accordance with the reaction forces produced by the braking operation. The head is separated from the bolt and the same is permanently connected with the yoke portion.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The single figure of the drawing is a longitudinal sectional view of a brake reinforced in accordance with the invention.

DESCRIPTION OF THE PREFERRED EMBODIMENT

Referring now to the drawing, a U-shaped supporting means has leg portions 1 and 2, and a yoke portion 1a connecting the leg portions. Guide means, not shown, are provided for guiding supporting body 1, 1a, 2, in longitudinal direction of the yoke, parallel to the axis of rotation of a brake disc 3, which is located between legs 1 and 2. Brake jaws 6 and 7 carrying brake linings 4 and 5 are located on opposite sides of the outer peripheral portion of the rotary brake disc 3. Brake jaw 6 with brake lining 4 is mounted on leg portion 1, while brake jaw 7 with brake lining 5 is mounted on the piston 13, which is movable toward and away from brake disc 3, and is operated by a fluid supplied to and discharged from the cylinder 2a formed in leg portion 2.

When fluid, such as brake oil, is admitted into cylinder 2a, piston 13 moves brake jaw 7 with lining 5 into contact with one side of the rotary brake disc 3, which is mounted in bearing means, not shown, preventing axial movement of the brake disc. Consequently, pressure by brake jaw 7, 5 against brake disc 3 wil produce a reaction force acting on the bottom of cylinder 2a so that leg portion 2 and thereby the entire supoprting body will be displaced to the right, as viewed in the drawing untill lining 4 abuts the other side of brake disc 3 in which position great brake forces are exerted on the disc which compensate each other, while corresponding great reaction forces act outwardly on leg portions 1 and 2 producing a bending moment on yoke portion 1a.

Furthermore, the rotating brake disc 3 exerts a circumferential force on linings 4, 5, jaws 6, 7, and legs 1 and 2 which tend to displace and deform the non-rotatable supporting body.

In accordance with the present invention, a longitudinal bore 8 connects the ends of the yoke portion which are located in the regions of the legs 1 and 2. At one end of the bore, a short thread 9 is provided whereas the other end of the bore has a wider portion forming an annular abutment face 11a.

A bolt 10 having a threaded end portion 10a is screwed into the threaded bore portion 9 until a projecting abutment portion of the form of a flange 11 and a split ring 11b in a recess 1b of yoke portion 1a, abut the annular abutment face 11a. A head 14 with a slot 14a is connected by a neck portion 12 to flange 11, and when a screw driver is inserted into the slot 14a, the bolt is turned until it is highly tensioned and longitudinaly compressed and prestresses yoke portion 1a.

Neck portion 12 has a smaller diameter than bolt 10 and is dimensioned so that when sufficient pressure is exerted by bolt 10 on the yoke portion 1a to prestress the same as required by the bending moment of the reaction forces acting thereon during a breaking operation, the torque exerted by the screw driver on head 14, twists neck 12 until the same breaks so that head 14 comes off the bolt and can be discarded. The line 12a indicates the final condition of the neck 12 in which the brake is used and operated. Consequently, it is not possible to use a screw driver or other tool for loosening bolt 10 which is permanently connected with the supporting body and prestresses the yoke portion against the bending moments produced by the reaction forces of the brake forces.

Only one bore 8 is shown, and it will be understood that several longitudinal parallel bores can be provided in the yoke portion so that several bolts can be used for reinforcing the same.

Due to the fact that the reinforcing bolt, or bolts, take up most of the bending forces, it is possible to construct the supporting body of a light metal, and to use steel bolts for reinforcing the supporting body.

It will be understood that each of the elements described above, or two or more together, may also find a useful application in other types of brakes differing from the types described above.

While the invention has been illustrated and described as embodied in a reinforcing bolt passing longitudinally through the yoke of the supporting body of the brake jaws of a brake, it is not intended to be limited to the details shown, since various modifications and structural changes may be made without departing in any way from the spirit of the present invention.

Without further analysis, the foregoing will so fully reveal the gist of the present invention, that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Reinforced brake comprising, in combination, an integral substantially U-shaped supporting body composed of an integral yoke portion having ends, and a pair of leg portions at said ends of said integral yoke portion; brake means between said leg portions; operating means mounted on at least one of said leg portions, and first and second brake jaws respectively mounted on said operating means and on the other leg portion on opposite sides of said brake means whereby said operating means, when actuated, presses with a braking force said brake jaws into frictional contact with opposite sides of said brake means so that reaction forces act on said leg portions, and tend to spread the same and to bend and tension said integral yoke portion; and pretensioned means abutting said ends of said yoke portion and extending between said ends to prestress said yoke portion with a pressure opposing the tension and the bending moment produced by said reaction forces, said pretensioned means being tensioned to a predetermined degree so that no deformation of said yoke portion takes place during braking operations requiring predetermined maximal brake forces.

2. A brake as defined in claim 1, wherein said yoke portion is formed with at least one bore extending through said yoke from end to end; and wherein said pretensioned means passes through said bore and has end portions abutting said yoke portion.

3. A brake as claimed in claim 1 wherein said yoke portion is formed with a longitudinal bore having a thread at one end and an abutment face on the other end; and wherein said pretensioned means is a bolt having at one end a thread engaging said thread of said bore and at the other end a projecting portion abutting said abutment face, and being pretensioned to said predetermined degree.

4. Reinforced brake as claimed in claim 1 wherein said yoke portion is formed with at least one bore between said ends, said bore having a thread at one end and an abutment at the other end; and wherein said pretensioned means includes at least one pretensioned bolt having at one end a thread engaging said thread of said bore and at the other end a projecting portion abutting said abutment; comprising a head adapted to be turned by a tool, and a neck portion connecting said head with said other end of said bolt so that by turning said head, first said thread of said bolt is screwed into said thread of said bore until said projecting portion abuts said abutment whereupon said bolt is pretensioned by further turning of said head, said neck portion being dimensioned so as to be twisted off and break when said bolt is tensioned to said predetermined degree.

5. A brake as claimed in claim 4 wherein said bore is disposed in the longitudinal center line of said yoke.

6. Reinforced brake as claimed in claim 4 wherein only said head of said bolt includes a means adapted to couple a tool with said head and thereby said bolt for turning movement so that said other end cannot be turned by a tool after said neck portion and head are twisted off.

7. Reinforced brake as claimed in claim 6 wherein said yoke portion has a recess receiving said projecting portion of said bolt so that no tool can be applied to the latter after said neck portion and head are twisted off.

8. A brake as claimed in claim 4 wherein said neck portion has a smaller diameter than said bolt.

9. A brake as claimed in claim 8 wherein said head has a greater diameter than said bolt, and wherein said projecting portion is a flange having a greater diameter than said bolt.

References Cited

UNITED STATES PATENTS

| 2,820,530 | 1/1958 | Chouings et al. | 188—73 |
| 3,051,272 | 8/1962 | Burnett | 188—73 |
| 3,312,317 | 4/1967 | Hawley et al. | 188—73 X |
| 3,357,523 | 12/1967 | Reed et al. | 188—73 |

FOREIGN PATENTS

| 684,821 | 12/1952 | Great Britain. |
| 898,026 | 6/1962 | Great Britain. |

GEORGE E. A. HALVOSA, Primary Examiner